United States Patent [19]

Gustafson et al.

[11] Patent Number: 4,918,932
[45] Date of Patent: Apr. 24, 1990

[54] METHOD OF CONTROLLING THE CAPACITY OF A TRANSPORT REFRIGERATION SYSTEM

[75] Inventors: Alan D. Gustafson, Eden Prairie; Lowell B. Naley, Minnetonka; David A. Christiansen, Bloomington; Stanley O. Hoium, Eagan; Robert L. Harrington, Eden Prairie; Dannis R. Johnson, Savage; Gregory R. Truckenbrod, Fridley, all of Minn.

[73] Assignee: Thermo King Corporation, Minneapolis, Minn.

[21] Appl. No.: 356,146

[22] Filed: May 24, 1989

[51] Int. Cl.$^5$ ............................................. F25B 1/00
[52] U.S. Cl. ........................................ 62/89; 62/209; 62/229; 236/78 D
[58] Field of Search ............ 236/78 D, 91 F; 62/209, 62/211, 229, 89

[56] References Cited

U.S. PATENT DOCUMENTS

| | | | |
|---|---|---|---|
| 2,396,204 | 3/1946 | Pearce | 62/209 |
| 3,581,986 | 6/1971 | Magri | 236/78 B X |
| 3,973,618 | 8/1976 | Naley et al. | 165/27 |
| 4,355,760 | 10/1982 | Ruby | 236/68 B X |
| 4,589,060 | 5/1980 | Zinsmeyer | 364/148 |
| 4,663,725 | 5/1987 | Truckenbrod | 364/505 |
| 4,715,190 | 12/1987 | Han et al. | 62/201 |

Primary Examiner—William E. Wayner
Attorney, Agent, or Firm—D. R. Lackey

[57] ABSTRACT

A method of controlling a refrigeration system by determining an average air temperature by sensing and averaging evaporator return and discharge air temperatures, and developing an average error by using the average air temperature and a selected set point temperature. The average air temperature is then used to calculate a proportional error and an integral error, and the discharge air temperature is used to calculate a floor error. The proportional error, integral error and floor error are weighted by predetermined gain factors and then summed to provide an error signal which is used to modulate the capacity of the refrigeration system, with the control mode depending upon the location of the error signal relative to set point.

6 Claims, 7 Drawing Sheets

METHOD OF CONTROLLING THE CAPACITY OF A TRANSPORT REFRIGERATION SYSTEM

TECHNICAL FIELD

The invention relates in general to refrigeration systems, and more specifically to a method of controlling the capacity of a transport refrigeration system.

BACKGROUND ART

In the transport of perishable products, such as via refrigerated trailers or refrigerated containers commonly called "reefers", it would be desirable to utilize a control arrangement that quickly reduces the product temperature to a pre-selected set point temperature.

It is not possible, however, to have the entire perishable load at the set point temperature with a mechanical refrigeration system, as the refrigeration system draws return air from a served space, passes it through an evaporator coil, and discharges the conditioned air back into the served space. Thus, the return air is warmer than the discharge air when the system is in a cooling mode. The product closest to the discharge point will thus be the coldest, and the product closest to the return point will be the warmest.

Various control arrangements have been used in the prior art in attempts to achieve the best temperature control of a served space, but all seem to suffer at least one disadvantage.

SUMMARY OF THE INVENTION

Briefly, the present invention is a method of controlling the cooling capacity of a transport refrigeration system which provides the desirable characteristics of a mechanical refrigeration system for controlling the temperature of a perishable product, without the offsetting disadvantages which accompany prior art temperature control arrangements. The system achieves fast pull down of the average evaporator air temperature to the selected set point temperature by sensing and averaging the evaporator air return temperature and the evaporator air discharge temperature. The system modulates cooling capacity in a proportional band just above set point. The system provides a lower temperature limit for the evaporator air discharge temperature, to prevent damaqe to the perishable load.

The desirable characteristics are achieved by first sensing and averaging the evaporator air return and air discharge temperatures. This average air temperature is then compared with the set point temperature to obtain an "average error". The average error is then used to calculate a proportional error and an integral error. The discharge air temperature is used to calculate a "floor" error relative to a lower limit or floor, below which it is not desirable for the discharge air temperature to go. The proportional error, integral error and floor error, which were weighted in their calculations by multiplying them by predetermined gain constants, are then summed to provide an error signal which is compared with the set point temperature. Different control modes are selected according to the location of the error signal relative to set point.

The control method of the invention results in rapid temperature pull down, the holding of the average air temperature at set point for most heat loads, and the prevention of the evaporator discharge air temperature from being too low during pull down and at high heat loads.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Typical results of common prior art refrigeration control arrangements will first be described relative to the graphs of FIGS. 1 through 5. Each graph plots the evaporator return air temperature, the evaporator discharge air temperature, and the average temperature of the two, versus time, for a large heat load.

Figure 1:
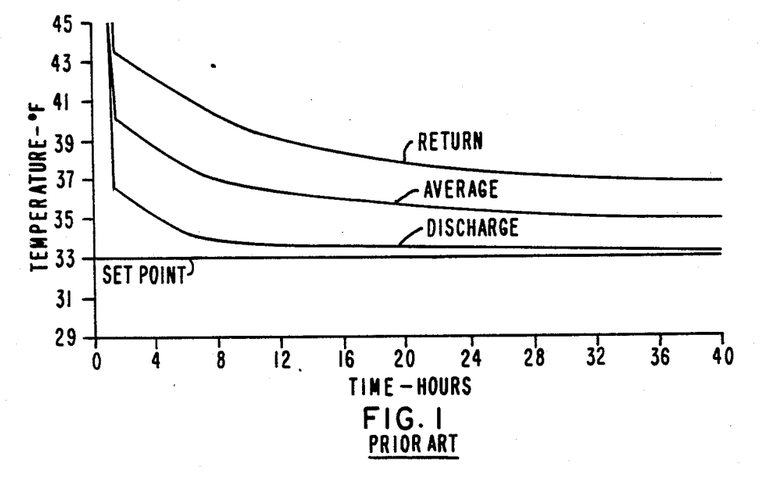
FIG. 1 is a graph which plots evaporator return air temperature, evaporator discharge air temperature and average air temperature versus time for a prior art control arrangement which senses the discharge air temperature and operates with a 1 degree F proportional band.

FIG. 1 illustrates a refrigeration control arrangement which senses evaporator discharge air temperature, and which operates with a 1 degree F proportional band. The major disadvantage of this control arrangement is the fact that the average air temperature will never reach set point, under any heat load situation.

Figure 2:
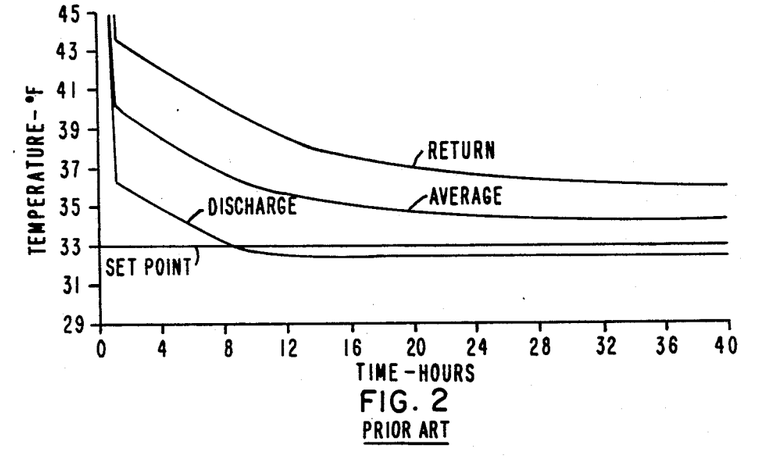
FIG. 2 is graph similar to FIG. 1, for a prior art control arrangement which is similar to FIG. 1 except for the incorporation of a 1 degree F offset.

FIG. 2 illustrates a control arrangement similar to that which produced the results of FIG. 1, except additionally incorporating a −1 degree F offset. This arrangement tends to drive the average air temperature to set point, but it will only accomplish this result for one heat load situation.

Figure 3:
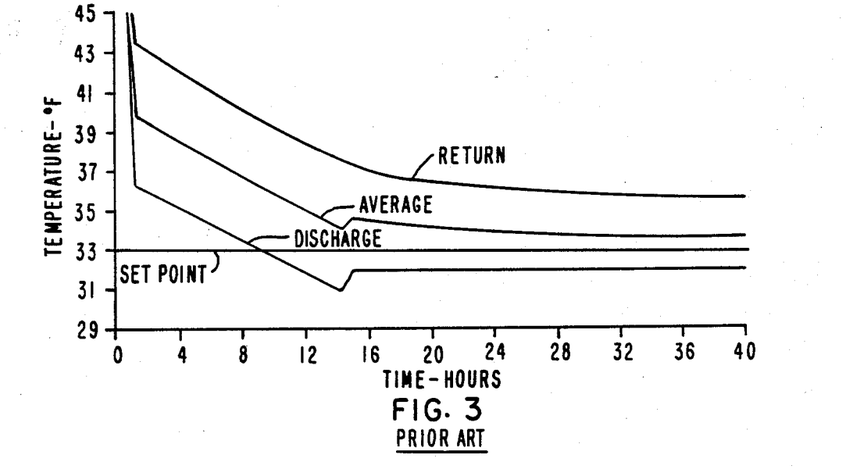
FIG. 3 is a graph similar to FIG. 1, for a prior art control arrangement which is similar to FIG. 2 except for the incorporation of integral correction.

FIG. 3 illustrates a control arrangement similar to that which produced the results of FIG. 2, except additionally incorporating integral correction which forces the temperature of the discharge air to the offset temperature. While this enhances the control, it has the same disadvantage as the FIG. 2 control, it will tend to drive the average air temperature to set point for only one heat load situation.

Figure 4:
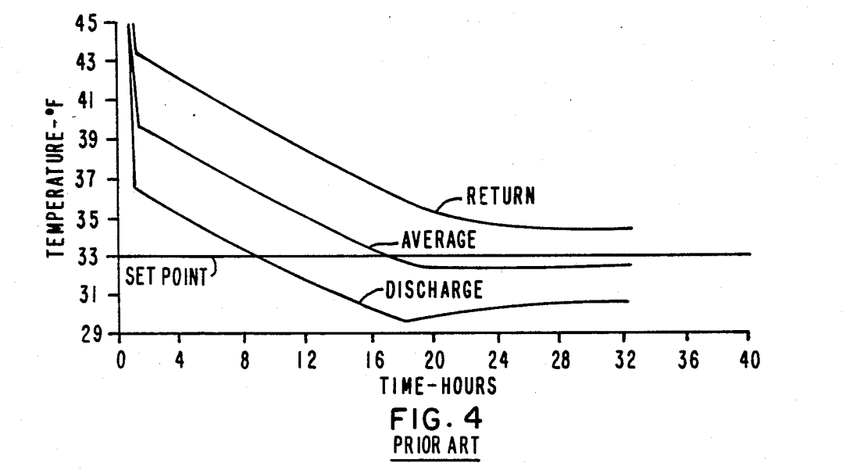
FIG. 4 is a graph similar to FIG. 1, for a prior art control arrangement which is similar to FIG. 1 except for sensing the evaporator air inlet temperature and the use of a 3 degree F proportional band.

FIG. 4 illustrates a control arrangement which senses the evaporator inlet air temperature and which has a 3 degree F. proportional band. The pull down rate is good and the average air temperature will reach set point for a large heat load situation. A disadvantage is the fact that the discharge air temperature may cause product damage.

Figure 5:
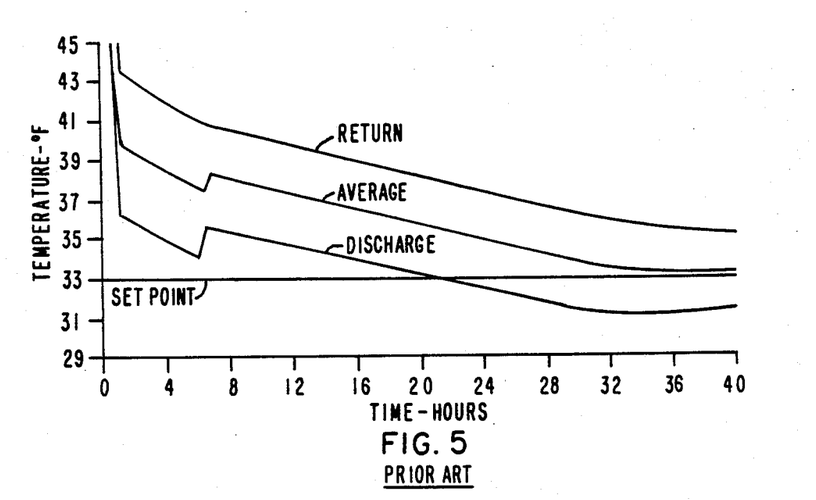
FIG. 5 is a graph similar to FIG. 1, for a prior art control arrangement which is similar to FIG. 4 except for the incorporation of a step change at a predetermined point during pull down.

FIG. 5 illustrates a control arrangement similar to that of FIG. 4, except with a step change to mitigate the deleterious effects of the discharge air temperature. A disadvantage is the fact that the control is ideal for only one heat load situation.

Figure 6:
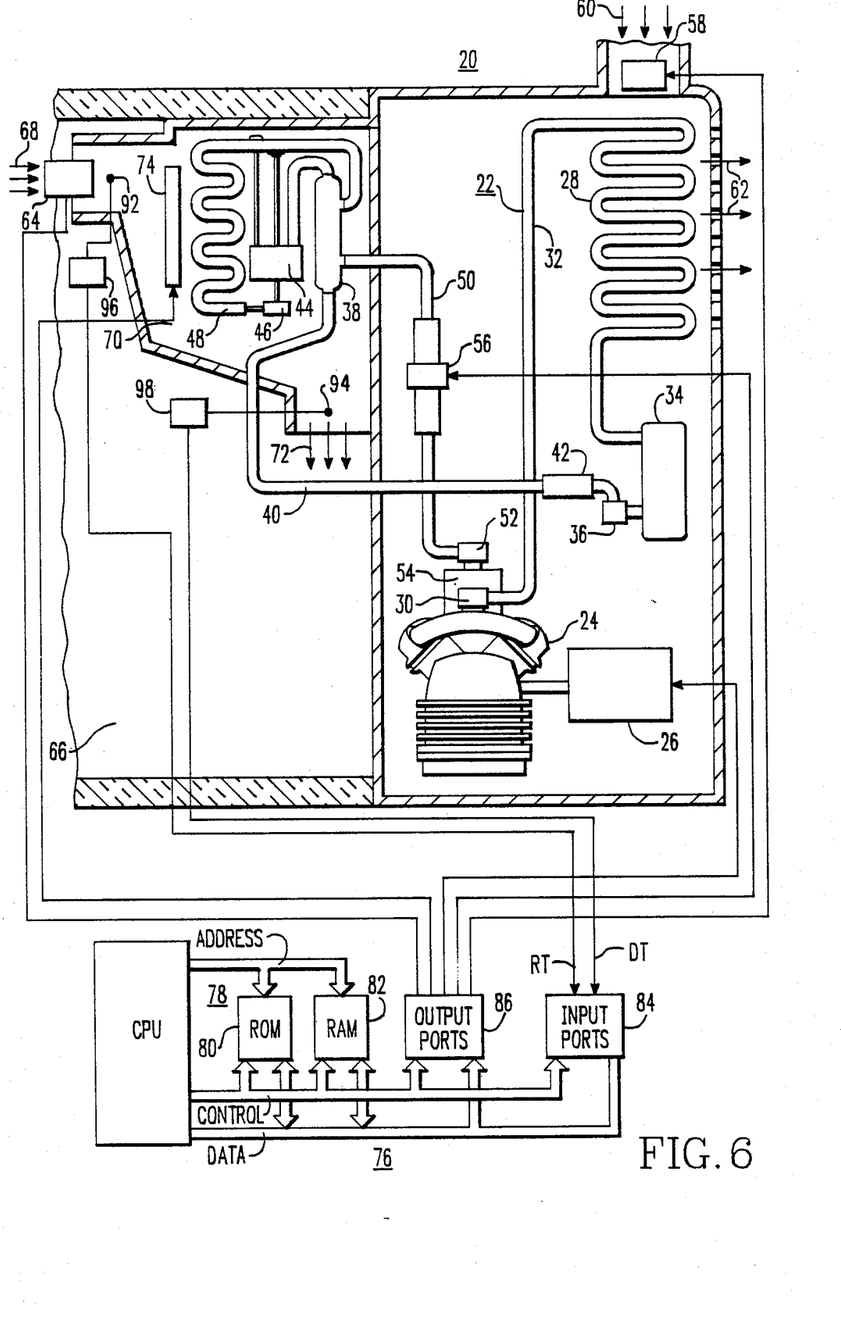
FIG. 6 is a schematic piping and wiring diagram of a transport refrigeration system which may utilize the teachings of the invention.

FIG. 6 is a piping and electrical schematic diagram of a transport refrigeration system 20 which may advantageously utilize the control methods of the invention. FIG. 6 is similar to FIG. 1 of U.S. Pat. No. 4,663,725, and this patent is hereby incorporated into the specification of the present application by reference.

More specifically, transport refrigeration system 20, which may be a refrigerated truck, trailer or reefer, comprises a refrigerant circuit 22 which includes a refrigerant compressor 24 driven by a prime mover, such as an internal combustion engine indicated generally at 26. Discharge ports of compressor 24 are connected to an inlet of a condenser coil 28 via a discharge service valve 30 and a hot gas conduit or line 32. The outlet side of condenser coil 28 is connected to the inlet side of a receiver tank 34. An outlet valve 36 on the outlet side of receiver tank 34 is connected to a heat exchanger 38 via a liquid conduit or line 40 which includes a dehydrator 42.

Liquid refrigerant from liquid line 40 continues through a coil in heat exchanger 38 to a thermostatic expansion valve 44. Expansion valve 44 is controlled by an expansion valve thermal bulb and an equalizer line. The outlet of expansion valve 44 is connected to a distributor 46 which distributes refrigerant to inlets on the inlet side of an evaporator coil 48. The outlet side of evaporator coil 48 is connected to the suction port of compressor 24 via heat exchanger 38, a suction line 50, a suction line service valve 52, and a suction throttling valve 54. Also disposed in suction line 50 is an electrically controllable modulation valve 56.

A condenser fan 58 draws outside air, indicated by arrows 60, over condenser coil 28, and the heated air is discharged from system 20, as indicated by arrows 62. An evaporator fan 64 draws return air from a served space 66, with the return air being indicated by arrows 68, into an evaporator plenum 70 where it passes over the evaporator coil 48. The resulting conditioned air, indicated by arrows 72, is discharged back into the served space 66. Means is provided for adding heat to the conditioned air 72 when necessary to hold set point, such as electrical heaters indicated generally at 74, or by passing hot refrigerant gas directly through the evaporator coil 48, as desired.

Electrical control 76 for controlling the operation of transport refrigeration system 20 is illustrated as including a microprocessor or computer 78 which includes a read-only memory (ROM) 80, a random-access memory (RAM) 82, input ports 84 and output ports 86. The control function 76 may be implemented in other ways, such as with a programmable controller and hard wired logic, but the preferred implementation is with a computer, and it will be so described.

Electrical control 76, among other things, receives input signals from return air and discharge air temperature sensors 92 and 94 disposed in evaporator plenum 70, with the temperature signals returning to the input ports 84 of computer 78 via signal conditioners 96 and 98, respectively, which may include A/D converters.

Electrical control 76 provides output signals for controlling condenser fan 58, suction line modulation valve 56, prime mover 26 and thus compressor 24, evaporator fan 64, and heaters 74.

Figure 7:
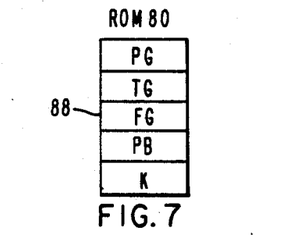
FIG. 7 is a ROM map setting forth certain constants which are used during an implementation of the control methods of the invention.
Figure 8:
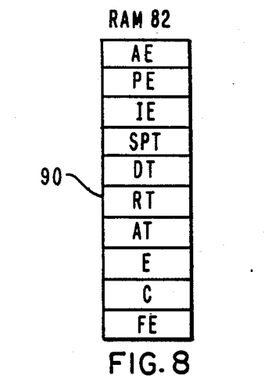
FIG. 8 is a RAM map setting forth certain variables which are used during an implementation of the control methods of the invention.
Figure 9:
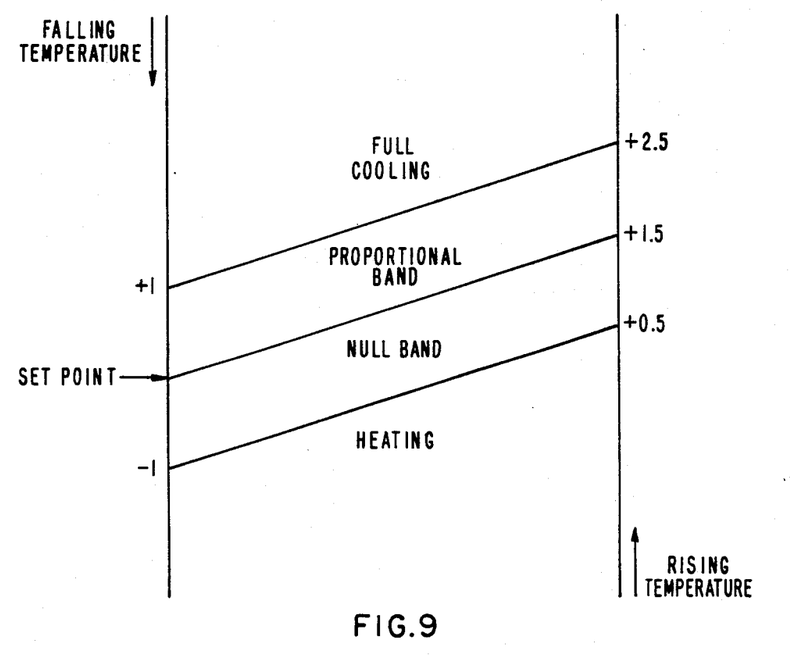
FIG. 9 is a diagram of a temperature algorithm used by the control methods of the invention.
Figure 10:
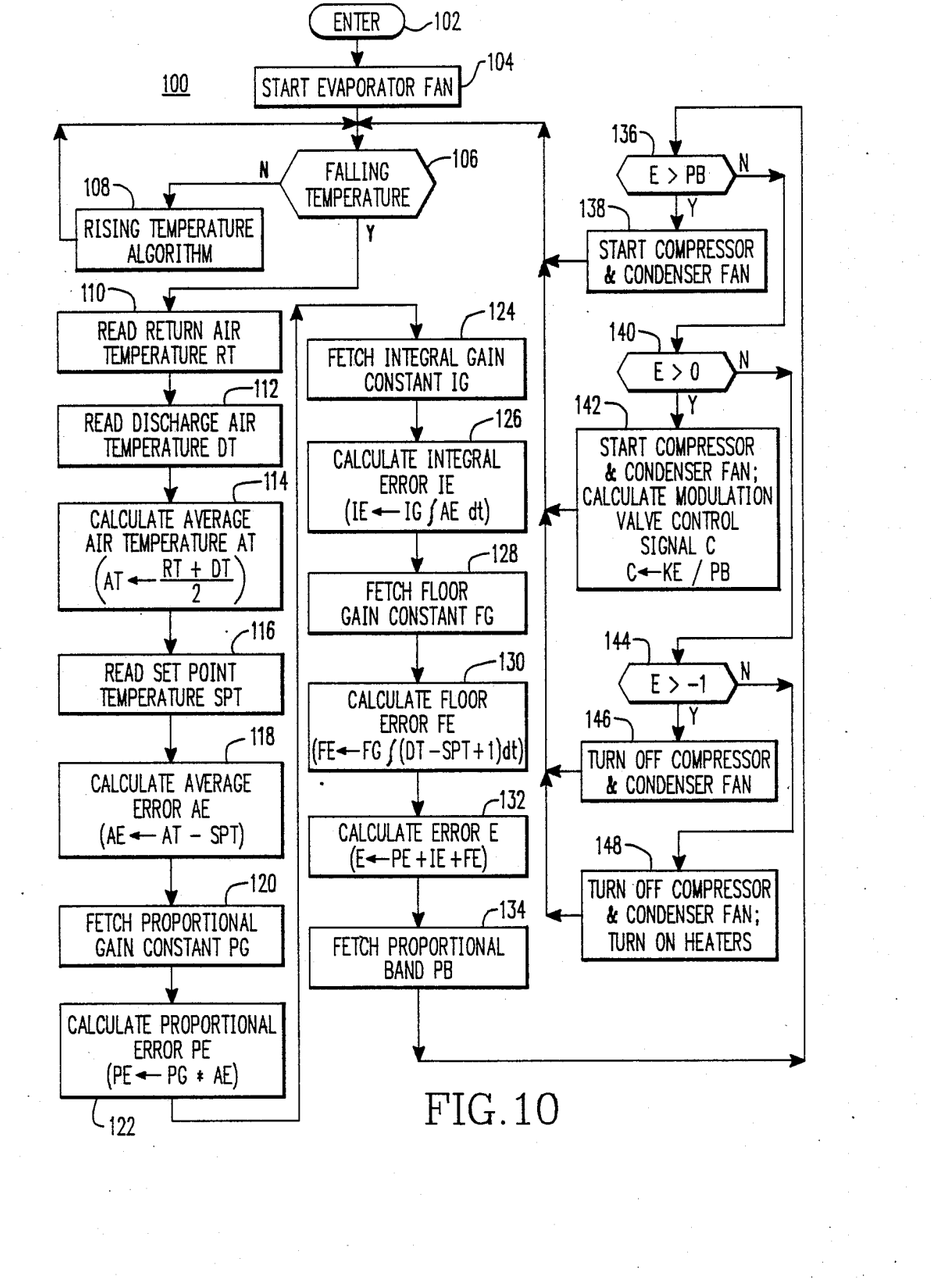
FIG. 10 is a detailed flow chart which implements the control methods of the invention.

FIG. 7 is a ROM map 88 illustrating some constants which are stored in ROM 80 for use by a computer program 100 set forth in FIG. 10. FIG. 8 is a RAM map 90 which illustrates some variables which are stored in RAM 82 during the running of the program 100 shown in FIG. 10. FIG. 9 is a diagram which sets forth basic cooling and heating modes, as well as temperature bands, utilized by the invention.

FIG. 10 is a flow chart of a computer program 100 which is stored in ROM 80 for operating transport refrigeration system 20 according to the methods of the invention. Program 100 is entered at 102 when the transport refrigeration system 20 is turned on, and step 104 provides a signal which is output by computer 78 to start the evaporator fan 64. Step 106 checks to see if the system 20 will be or is in pull down, i.e., a falling temperature mode, or a rising temperature mode. As illustrated in the diagram of FIG. 9 the rising temperature mode is the same as the falling temperature mode except for a hysteresis of 1.5 degrees F. Thus, FIG. 10 sets forth a program for the falling temperature mode, with the rising temperature mode being indicated generally at 108.

It will be assumed that the system 20 is in initial pull down, and thus step 106 advances to steps 110 and 112 which respectively read the evaporator return air and discharge air temperatures RT and DT, with the latest readings of RT and DT being stored in RAM 82, as shown in the RAM map 90 of FIG. 8. Step 114 then calculates an average air temperature AT by summing RT and DT and dividing the sum by 2. The latest calculation of the average air temperature AT is stored in RAM 82.

Step 116 then reads the selected set point temperature SPT which is stored in RAM 82, and step 118 calculates the "average error" AE by subtracting the set point temperature SPT from the average temperature AT. Upon start-up the average error AE will be a relatively large positive number. The average error AE is then used to calculate components of an error signal E.

More specifically, step 120 obtains a proportional gain constant PG stored in ROM 80. This constant, which is determined experimentally, is used to calculate a proportional error PE in step 122, by multiplying the proportional gain PG by the average error AE. Thus, the proportional gain is a weighting factor, which is used to determine how much weight the proportional error should have in the composite error signal E. A typical value for the proportional gain PG is 1.

Step 124 obtains an integral gain factor IG from ROM 80, and step 126 calculates an integral error IE which is used to force the average air temperature to set point, regardless of whether the load is a high, medium or low heat load. Step 126 integrates the average error AE with respect to time, and the resulting value is multiplied by the integral gain factor IG. A typical value for the integral gain factor IG is 0.5/Hrs.

Step 128 obtains a floor gain constant FG from ROM 80, and step 130 calculates a floor error FE. The floor error is related to a selected floor temperature which determines how low the discharge air temperature will be allowed to go. Once the discharge air temperature reaches this lower limit or "floor", the floor error will dominate the other factors of the control and prevent damage to the load by preventing the discharge air from falling below this floor value for any significant amount of time. For purposes of example, the floor temperature is selected to be 1 degree F. below set point. As shown in step 130, the floor error FE is calculated by taking the integral of the expression DT−SPT+1 with respect to time. DT is the discharge air temperature, SPT is the set point temperature, and 1 is the floor temperature. The value 1 is added to the difference between the set point temperature and the discharge air temperature in order to provide a value of zero when the discharge air temperature is 1 degree F below the set point temperature. The resulting integral is multiplied by the floor gain factor FG. A typical value for the floor gain FG is 1/Hrs. Step 132 then calculates the error signal E by summing the proportional error PE, the integral error IE and the floor error FE. Once the error signal E has been calculated, program 100 is then ready to start a portion of the program which determines which of the modes set forth in the diagram of FIG. 9 the system 20 should be operating in.

More specifically, step 134 obtains the selected proportional band PB from ROM 80, which for purposes of example will be assumed to be +1 degree F. Step 136 starts a series of comparison steps which utilize the error signal E, to determine which of the control functions to execute. Step 136 determines if the error signal E exceeds the proportional band PB. If the error signal E is above the proportional band, step 138 issues commands to start the compressor 24, i.e., the prime mover 26 is started, and to start the condenser fan 58. The system 10 is then in a rapid pull down phase, which continues until a subsequent running of the program 100 finds that the error signal E no longer exceeds the proportional band PB. When step 136 finds this condition, step 140 determines if the error signal E is greater than zero. If so, step 142 continues the operation of the compressor 24 and condenser fan 58, and additionally calculates a control signal C for controlling the extent to which the suction line modulation valve 56 is closed.

Control signal C is a function of the error signal E, the proportional band PB, and an output constant K stored in ROM 80. The control signal C is generated by dividing E by the proportional band PB and multiplying by the output constant K. The resulting control signal C is output to the modulation valve 56 and the capacity of the refrigeration system 20 is adjustably controlled.

System 20 remains in the modulation mode until a subsequent running of program 100 finds that the error signal is no longer greater than zero. When this occurs, step 140 advances to step 144 which determines if the error signal E is above the floor value of −1. If it is greater than −1, the error signal is in the null band and step 146 issues commands to turn off compressor 24, ie., to turn off prime mover 26, and to turn off the condenser fan 58.

The system 20 will remain in the null band until the temperature continues to fall, falling below the null band, or the temperature begins to rise, which will result in the running of the rising temperature algorithm 108. If the temperature continues to fall, when E no longer exceeds −1, step 148 continues the shut down modes of the compressor and condenser fan, and additionally issues a command to turn on the heating function 74.

When the heating function 74 is activated, the temperature of the served space 66 will start to increase and the rising temperature algorithm 108 will maintain the heating function via a program step comparable to step 148 until the error is 0.5 degree F above set point, at which time the null band controlled by step 146 will control until the error reaches +1.5 degrees above set point. If the error signal E continues to increase, the proportional band is entered, and modulated cooling is initiated by step 142. If the temperature continues to rise, when the error signal reaches +2.5 degrees F above set point, step 138 will initiate full cool to start the temperature to drop, which will then cause the control to utilize the falling temperature values for changing control modes.

Figure 11:
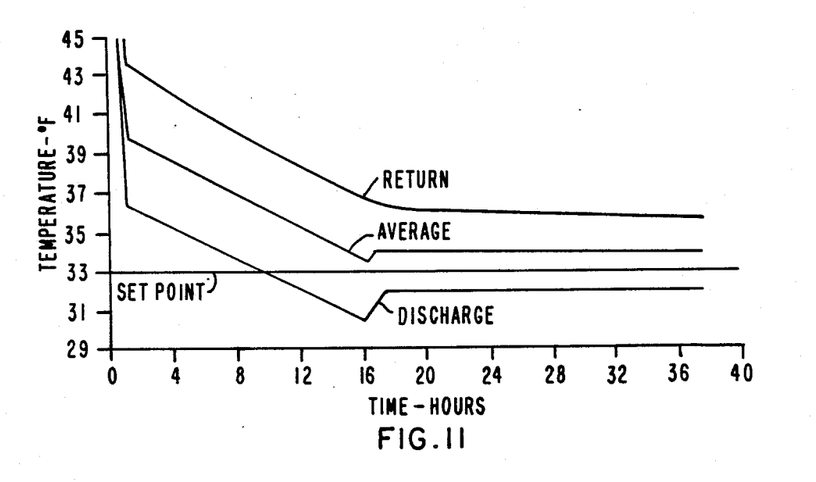
FIG. 11 is a graph similar to that of FIG. 1, setting forth control of a large heat load according to the teachings of the invention, including a 1 degree F proportional band, integral correction, and a −1 degree F floor on the temperature of the evaporator discharge air.
Figure 12:
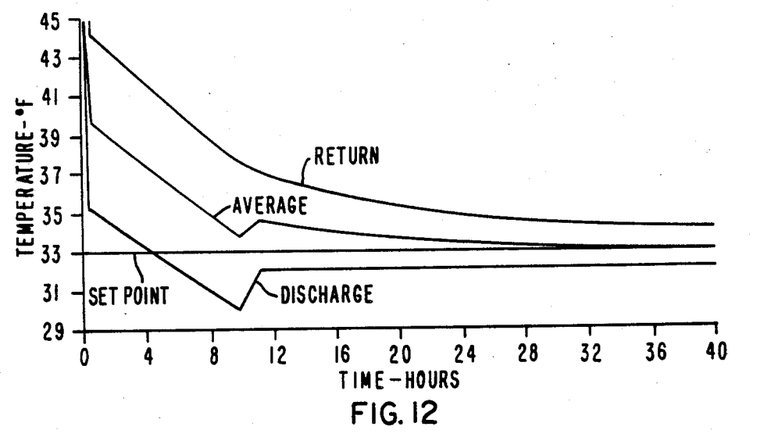
FIG. 12 is a graph similar to that of FIG. 11 except for a medium heat load.
Figure 13:
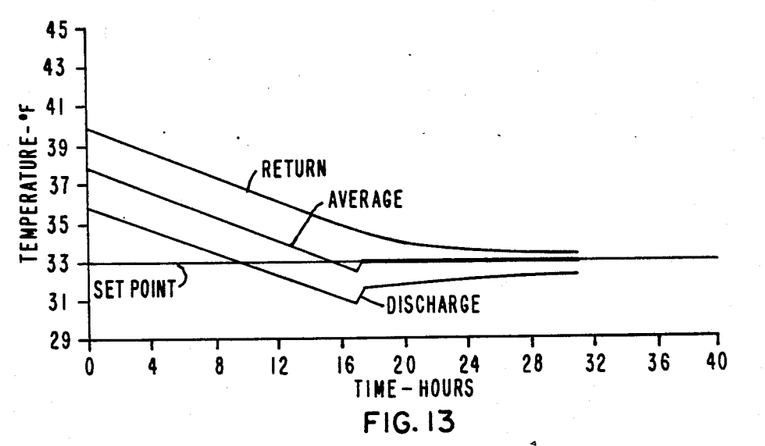
FIG. 13 is a graph similar to that of FIGS. 11 and 12 except for a small heat load.

FIGS. 11, 12 and 13 are graphs similar to the graphs of FIGS. 1 through 5, except illustrating the evaporator return air, discharge air, and average air temperatures for a system 20 operating according to the teachings of the invention. FIGS. 11, 12 and 13 illustrate large heat, medium heat and small heat loads, showing that the teachings of the invention are effective at different heat loads. Thus, the curves of FIGS. 11, 12 and 13 demonstrate the characteristics of a control arrangement which utilizes the average evaporator air temperature to generate an error for control. In the example, the control arrangement has a +1 degree F proportional band, it has integral correction which forces the average air temperature to set point, and it has an evaporator air discharge floor temperature which is 1 degree less than the set point temperature. For the large heat load of FIG. 11, the floor correction dominates the integral correction. FIGS. 12 and 13 indicate the control characteristics of the invention at reduced heat loads, and in both instances the average air temperature reaches set point, the pull down rate is maximum, and the discharge air temperature is acceptable. Thus, the method of the invention provides all of the desirable temperature characteristics for transport perishable products, including quick pull down, the maintaining of the average air temperature at set point for most heat loads, and the prevention of the discharge air from being too low during pull down and with high heat loads.

We claim:

1. A method of controlling a refrigeration system having a compressor driven by a prime mover, a condenser, a condenser fan, an evaporator, and an evaporator fan, to control the temperature of a served space to a selected set point temperature, wherein the evaporator fan draws return air from the served space and discharges conditioned air back into the served space, comprising the steps of:

sensing the temperature of the return air, sensing the temperature of the discharge air, determining the average of the sensed return air and discharge air temperatures, determining the difference between the average air temperature and the selected set point temperature to provide an average error.

and using the average error to control the capacity of the refrigeration system, said step of using the average error to control the capacity of the refrigeration system including the steps of:

determining a proportional error as a function of the average error, determining an integral error as a function of the integral of the average error, determining a lower limit error as a function of the integral of the difference between the discharge air temperature and the selected set point temperature, plus a predetermined floor temperature, calculating an error signal by summing the proportional error, integral error and floor error, comparing the error signal with predetermined parameters, and controlling the capacity of the refrigeration system in response to the comparing step.

2. The method of claim 1 wherein the comparing step includes the steps of successively comparing the error signal with predetermined temperature values relative to the selected set point temperature, to determine if the error signal indicates a temperature which is:

higher than a predetermined proportional band relative to the selected set point temperature, within the predetermined proportional band, lower than the set point temperature but at or above a predetermined floor value, or lower than the predetermined floor temperature.

3. The method of claim 2 including the step of starting the compressor and condenser fan when the error signal indicates a temperature which exceeds the proportional band.

4. The method of claim 2 including the step of starting the compressor and condenser fan when the error signal is within the proportional band, and the step of calculating a control signal value for controlling a suction line modulation valve as a function of the error signal and the proportional band.

5. The method of claim 2 including the step of turning off the compressor and condenser fan when the error signal is below the set point but above the predetermined floor temperature.

6. The method of claim 2 including the steps of turning off the compressor and condenser fan, and turning on a heating function, when the error signal is below the predetermined floor temperature.

* * * * *